United States Patent
Tomastik (10) Patent No.: US 8,775,359 B2
(45) Date of Patent: Jul. 8, 2014

(54) SYSTEM AND METHOD FOR OCCUPANCY ESTIMATION

(75) Inventor: Robert T. Tomastik, Rocky Hill, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 1030 days.

(21) Appl. No.: 12/733,752

(22) PCT Filed: Sep. 19, 2007

(86) PCT No.: PCT/US2007/020291
§ 371 (c)(1),
(2), (4) Date: Mar. 18, 2010

(87) PCT Pub. No.: WO2009/038558
PCT Pub. Date: Mar. 26, 2009

(65) Prior Publication Data
US 2010/0250481 A1    Sep. 30, 2010

(51) Int. Cl.
G06F 19/00 (2011.01)
G06F 17/10 (2006.01)
G06N 7/00 (2006.01)
G05B 13/04 (2006.01)

(52) U.S. Cl.
CPC *G06N 7/00* (2013.01); *G05B 13/04* (2013.01); *G05B 13/048* (2013.01)
USPC .................................. 706/52; 706/17; 706/21

(58) Field of Classification Search
USPC ........................................................... 706/52
See application file for complete search history.

(56) References Cited

U.S. PATENT DOCUMENTS

| 5,335,180 A * | 8/1994 | Takahashi et al. ............ 701/117 |
| 5,790,019 A | 8/1998 | Edwin |
| 6,073,262 A | 6/2000 | Larkin et al. |
| 6,078,253 A | 6/2000 | Fowler |
| 6,314,204 B1 | 11/2001 | Cham et al. |
| 6,499,025 B1 | 12/2002 | Horvitz et al. |
| 6,615,175 B1 | 9/2003 | Gazdzinski |
| 7,035,764 B2 | 4/2006 | Rui et al. |
| 7,068,599 B1 | 6/2006 | Jiang et al. |
| 7,109,685 B2 | 9/2006 | Tate, Jr. et al. |
| 7,139,409 B2 | 11/2006 | Paragios et al. |

(Continued)

FOREIGN PATENT DOCUMENTS

EP    1717554 A2    2/2006

OTHER PUBLICATIONS

Bobruk et al. (Bobruk), Laser Motion Detection and Hypothesis Tracking from a Mobile Platform.*

(Continued)

*Primary Examiner* — Alan Chen
*Assistant Examiner* — Nathan Brown, Jr.
(74) *Attorney, Agent, or Firm* — Cantor Colburn LLP (57) ABSTRACT

An occupancy estimator calculates an occupancy estimate (x) of a region based on sensor data (z) provided by one or more sensor devices and a model-based occupancy estimate generated by an occupant traffic model (f). The occupant traffic model (f) is based on predicted movement of occupants throughout a region. The occupancy estimation system includes an occupancy estimator algorithm (20) that combines the sensor data (z) and the model-based occupancy estimate generated by the occupant traffic model (f) to generate an occupancy estimate (x) for the region.

19 Claims, 5 Drawing Sheets

(56) References Cited

U.S. PATENT DOCUMENTS

| | | | |
|---|---|---|---|
| 2003/0069002 A1 | 4/2003 | Hunter et al. |
| 2003/0215141 A1 | 11/2003 | Zakrzewski et al. |
| 2003/0234725 A1 | 12/2003 | Lemelson et al. |
| 2004/0249597 A1 | 12/2004 | Whitehead |
| 2005/0078852 A1 | 4/2005 | Buehler |
| 2005/0128070 A1 | 6/2005 | Faltesek et al. |
| 2005/0190053 A1 | 9/2005 | Dione |
| 2005/0201591 A1 | 9/2005 | Kiselewich |
| 2006/0062429 A1 | 3/2006 | Ramaswamy et al. |
| 2006/0088013 A1 | 4/2006 | Ganesh |
| 2006/0227862 A1 | 10/2006 | Campbell et al. |
| 2007/0003141 A1 | 1/2007 | Rittscher et al. |
| 2007/0027612 A1 | 2/2007 | Barfoot et al. |
| 2007/0031005 A1 | 2/2007 | Paragios et al. |
| 2007/0096896 A1 | 5/2007 | Zingelewicz et al. |

OTHER PUBLICATIONS

Yang et al. (Yang), Counting People in Crowds with a Real-Time Network of Simple Image Sensors.*
D. Beymer and K. Konolige, Real-time tracking of multiple people using continuous detection. [online], 1999 [retrieved on Nov. 28, 2012]. Retrieved from the Internet:<URL http://citeseerx.ist.psu.edu/viewdoc/summary?doi=10.1.1.46.7987>.*
DateForBeymer.*
Tomastik, "Agent-Based Simulation Model of People Movement in Buildings, Egress Project," Jun. 2006, pp. 1-12.
Search Report and Written Opinion of International Application No. PCT/US07/20291 filed Sep. 19, 2007.
Search Report and Written Opinion of International Application No. PCT/US07/20315 filed Sep. 19, 2007.
Search Report and Written Opinion of International Application No. PCT/US07/20279 filed Sep. 19, 2007.
Search Report and Written Opinion of International Application No. PCT/US07/20393 filed Sep. 20, 2007.
Search Report and Written Opinion of International Application No. PCT/US08/12580 filed Nov. 7, 2008.
Search Report and Written Opinion of International Application No. PCT/US08/02528 filed Feb. 26, 2008.
Search Report and Written Opinion of International Application No. PCT/US08/02520 filed Feb. 26, 2008.
Yang, Danny B., et al. "Counting People in Crowds with a Real-Time Network of Simple Image Sensors."
Bobruk, Joshua, et at. "Laser Motion Detection and Hypothesis Tracking from a Mobile Platform."
Meyn, Sean, et al. "Estimator based on sensor networks and pathy utility (and stimulator)."
"Geometric distribution." Wikipedia. Retrieved Oct. 2, 2008 from <http://en.wikipedia.org/wiki/Geometric_distribution> 4 pages.
"Constraint satisfaction." Wikipedia. Retrieved Oct. 7, 2008 from <http://en.wikipedia.org/wiki/Constraint_satisfaction> 3 pages.
"Poisson distribution." Wikipedia. Retrieved Oct. 2, 2008 from <http://en.wikipedia.org/wiki/Poisson_distribution> 7 pages.
"Optimization problem." Wikipedia. Retrieved Oct. 7, 2008 from <http://en.wikipedia.org/wiki/Optimization_problem> 2 pages.
Yoo, Yerin. "Tutorial on Fourier Theory." Mar. 2001. 18 pages.
Fleuret, Francois, et al. "Multi-Camera People Tracking with a Probabilistic Occupancy Map." Mar. 27, 2007.
"Tracking of Interacting People and Their Body Parts for Outdoor Surveillance." Jun. 17, 2005.
Biever, Celeste. "Buildings could save energy by spying on inhabitants." NewScientist. Apr. 2007. Retrieved Mar. 18, 2010 from <http://www.newscientist.com/article/dn11734> 2 pages.

* cited by examiner

SYSTEM AND METHOD FOR OCCUPANCY ESTIMATION

BACKGROUND

The present invention is related to estimating occupancy of a region, and more specifically to estimating occupancy of people within the region based on a combination of sensor data and occupant traffic models.

Knowledge regarding the occupancy of a particular region can be useful in a variety of applications. For instance, knowledge of occupancy within a building can be used to improve the efficiency, comfort, and convenience of a building and in emergency situations to improve search and rescue efforts of first responders by providing information regarding the location of occupants. Typically, building occupancy is determined based solely on data provided by sensors. These occupancy estimates may result in the generation of errors due to loss of sensor data or accumulation of errors in the sensor data over time.

SUMMARY

Described herein is a system for estimating occupancy in a region. The system includes inputs operatively connected to receive sensor data from one or more sensor devices and an occupancy estimator. An occupancy estimator is operably connected to the input to receive the sensor data. The occupancy estimator executes an algorithm that generates an occupancy estimate based on the received sensor data and an occupant traffic model that generates a model-based occupancy estimate. An output is operably connected to the occupancy estimator to communicate the occupancy estimate.

In another aspect, described herein is a method of estimating occupancy in a region. The method includes acquiring sensor data from one or more sensor devices; calculating a model-based occupancy estimate based on an occupant traffic model that predicts the traffic patterns of occupants within the region; and generating an occupancy estimate based on a combination of the acquired sensor data and the model-based occupancy estimate.

In another aspect, described herein is a system for estimating occupancy within a region. The system includes at least one sensor device for acquiring sensor data relevant to occupancy. The system further includes means for calculating a model-based occupancy estimate based on an occupant traffic model that predicts the movement of occupants within the region, and means for generating an occupancy estimate based on a combination of the acquired sensor data and the model-based occupancy estimate.

In another aspect, described herein is a distributed system for estimating occupancy within a region. The distributed system includes a first occupancy estimator operatively connected to receive sensor data associated with a first region and for executing an algorithm to generate a first occupancy estimate for the first region based on the received sensor data associated with the first region and a first occupant traffic model that generates a model-based occupancy estimate for the first region. The distributed system also includes a second occupancy estimator connectable to receive sensor data associated with a second region and for executing an algorithm to generate a second occupancy estimate for the second region based on the received sensor data associated with the second region and a second occupant traffic model that generates a model-based occupancy estimate for the second region.

In another aspect, described herein is a computer readable storage medium encoded with a machine-readable computer program code for generating occupancy estimates for a region, the computer readable storage medium including instructions for causing a controller to implement a method. The computer program includes instructions for acquiring input from one or more sensor devices. The computer program also includes instructions for calculating a model-based occupancy estimate based on an occupant traffic model that predicts movements of occupants with a region. The computer program further includes instructions for generating an occupancy estimate for the region based on a combination of the acquired sensor input and the model-based occupancy estimate.

DETAILED DESCRIPTION

Disclosed herein is a system and method for estimating occupancy based on data provided by sensor devices and an occupant traffic model. Sensor data may be provided by a variety of different types of sensor devices, each providing a different type of sensor output that is analyzed to detect occupant movements or locations throughout an area or region. The occupant traffic model is based on historical or expected traffic patterns of occupants throughout the area or region and may take into account factors such as layout of the region or building. For example, building layout may include information describing the location of exits, hallways, offices, and occupancy limits of associated hallways and offices. In addition, the occupant traffic model may be a mathematical model, a statistical model, or a computer simulation describing the predicted movement or traffic patterns of occupants within a region. An occupancy estimator takes as input both the sensor data and occupant traffic models, and executes an algorithm to generate an occupancy estimate for the area or region based on the provided inputs. The occupancy estimate based on both the sensor data and the occupant traffic models provides an occupancy estimation that is more accurate than the result of estimations based solely on sensor data or based solely on a model. In addition to the benefit of providing a more accurate estimation of occupancy and movement and changes thereto, the combination of sensor data with an occupant traffic model allows for the continued estimation of building occupancy despite the loss of data from one or more sensors, or pause in transmission of sensor data. This may be particularly beneficial in emergency situations in which sensors may be disabled or destroyed.

Figure 1A:
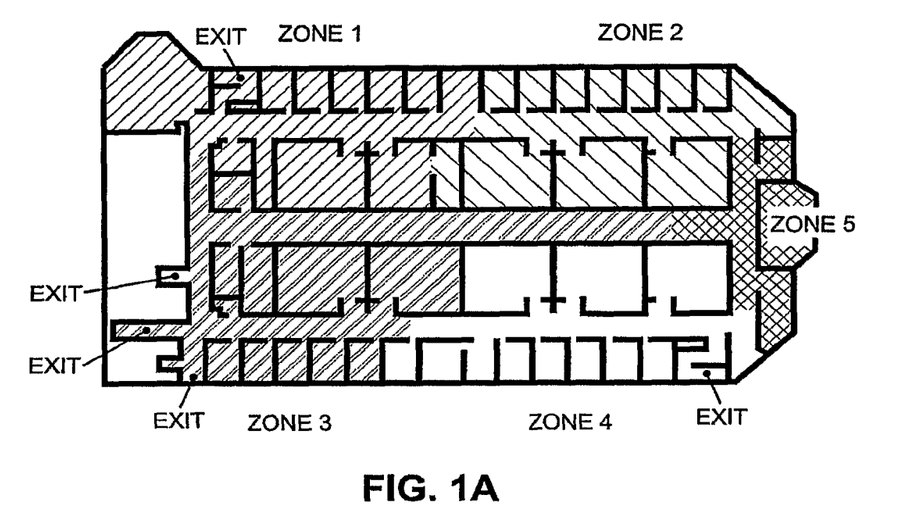
FIG. 1A is a schematic of a floor of a building divided into a number of zones.
Figure 1B:
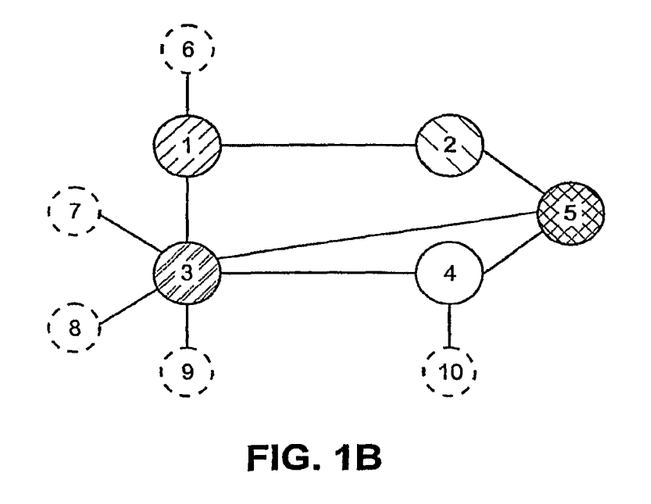
FIG. 1B is a diagram modeling the connection between zones of the building floor.

FIGS. 1A and 1B illustrate an example that will be used throughout this description to aid in describing the occupancy estimation algorithm, in which occupancy estimations are made for a particular floor of a building. The concepts described with respect to this embodiment could be applied in a variety of settings or locations (e.g., outdoors, train stations, airports, etc.). FIG. 1A illustrates the layout of a single floor in an office building. In this embodiment, the floor plan has been divided into five separate zones (labeled zones 1, 2, 3, 4 and 5). In other embodiments, the floor plan could be further sub-divided based on the location of individual offices and rooms (i.e., site-based sub-divisions). In this particular embodiment, the border between each adjacent zone 1-5 and at each exit includes a sensor (not shown) for detecting the movement of occupants from one zone to another. In other embodiments, additional sensors may be located in each zone to improve the resolution, reliability, and/or accuracy of occupancy estimates, or if a sensor at the border is not present or is not functioning.

FIG. 1B is a diagram illustrating the five zones defined in FIG. 1A. The large circles labeled 1, 2, 3, 4 and 5 represent the five zones, and the smaller circles labeled 6, 7, 8, 9 and 10 represent the exits from the building. The lines connecting zones indicate the presence of passages or hallways connecting adjacent zones.

The term 'region' is used throughout the description to refer to both a region as well as various sub-divisions of the region. For instance, in the exemplary embodiment shown in FIGS. 1A and 1B, the term 'region' refers to both the floor plan in general as well as to the individual sub-regions or zones 1-5. Therefore, generating an occupancy estimate for the region would include generating occupancy estimates for each of the individual zones.

In addition, the term 'occupancy estimate' is used throughout the description and refers generally to output related to occupancy. Therefore, an occupancy estimate for a region may include data such as a mean estimate of the number of occupants within the region, a probability associated with all possible occupancy levels associated with the region changes in occupancy, data indicative of the reliability of confidence associated with an estimate of occupancy, as well as other similarly useful data related to occupancy. Therefore, in the example shown in FIGS. 1A and 1B an occupancy estimate generated for a region would include any of the above-listed data generated for each of the zones 1-5.

Figure 2:
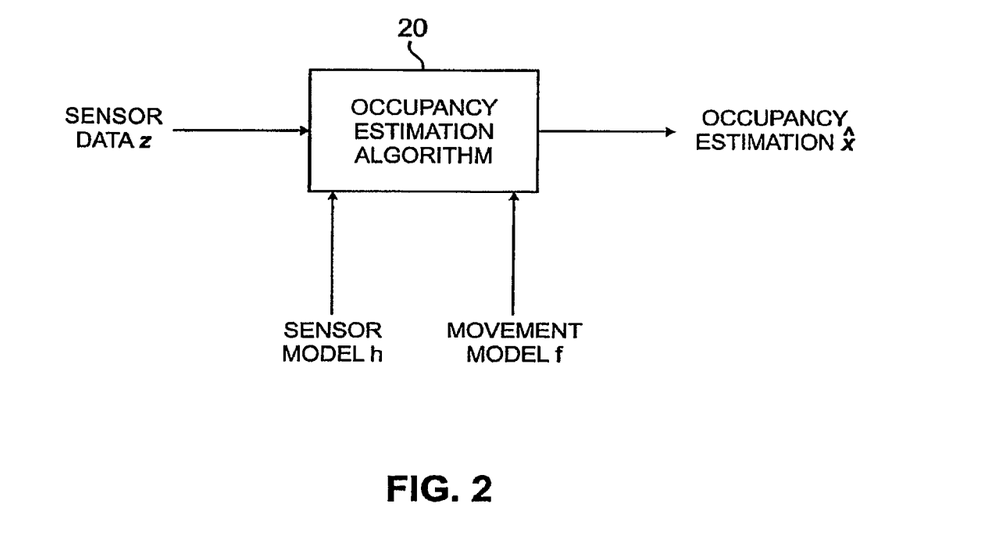
FIG. 2 is a flowchart illustrating the calculation of occupancy estimates based on sensor data, sensor models, and occupant traffic models.

FIG. 2 is a high-level block diagram illustrating an exemplary embodiment of the inputs provided to occupancy estimation algorithm 20. Inputs provided to occupancy estimation algorithm 20 include sensor data z (provided by one or more sensor devices), sensor model h, and occupant traffic model f. Occupancy estimation algorithm 20 derives an occupancy estimation $\hat{x}$ based on sensor data z, sensor model h, and occupant traffic model f. For instance, in the exemplary embodiment shown in FIGS. 1A and 1B, occupancy estimation algorithm 20 generates an occupancy estimate $\hat{x}$ for each of the five zones.

In an exemplary embodiment, sensor data z and occupancy estimate $\hat{x}$ are represented as vectors, although in other exemplary embodiments sensor data may be provided in other suitable formats. Occupant traffic model f is a mathematical, computer simulation, or statistical model used to predict expected traffic patterns of occupants throughout a region, where such model may use a previous estimate of occupancy in the region. For example, occupant traffic model f may be applied to a previous estimate of occupancy in each zone of the building to generate a predicted or model-based estimate of the occupancy in each zone of the building.

The model-based estimate of occupancy generated by applying the occupant traffic model f is then combined with sensor data z (if available) by occupancy estimation algorithm 20. Occupancy estimation algorithm 20 combines the model-based estimate of occupancy provided by the occupant traffic model f with the sensor data z by assigning weights to the respective inputs based on the predicted reliability of each. For example, if the sensor data z is determined to be highly reliable, then occupancy estimation algorithm 20 assigns a higher weight to the sensor data z and the corresponding occupancy estimation $\hat{x}$ is based in large part on the provided sensor data z. Vice versa, if the sensor data z is determined to be highly unreliable, then more weight is given to the model-based occupancy estimate provided by the occupant traffic model f.

Based on the model-based occupancy estimate, the sensor data z, and the weighting associated with both of these inputs, occupancy estimation algorithm 20 generates an occupancy estimate $\hat{x}$ for a region. For instance, with respect to the floor plan shown in FIGS. 1A and 1B, generation of an occupancy estimate $\hat{x}$ for the region may include generating an occupancy estimate for each of the five zones 1-5. In addition, the occupancy estimate $\hat{x}$ may include data such as the mean occupancy estimate associated with each of the five zones, the probability associated with each possible level of occupancy for each of the five zones, data related to movement of occupants within or between each of the five zones, as well as reliability associated with the above estimate for each of the five zones (e.g. a covariance value).

In addition, data generated as part of the occupancy estimate $\hat{x}$ may be interrelated to one another. For instance, the probability of occupancy in a region may be described graphically as a curve (e.g., a bell curve) that describes the likelihood associated with each possible occupancy level. The peak of the curve would represent the most likely estimate of the occupancy associated with the zone, but in addition, the shape of the curve (e.g., the standard deviation associated with the curve) would provide an indication of the confidence or reliability associated with the occupancy estimate. In other embodiments, the occupancy estimate x may include a confidence interval associated with the estimate, a covariance associated with the occupancy estimate, or other reliability calculations that indicate the confidence or reliability associated with an occupancy estimate $\hat{x}$.

In addition, in an exemplary embodiment the occupancy estimate $\hat{x}$ generated by occupancy estimation algorithm 20 is generated in real-time, allowing the occupancy estimate to be used in real-time applications (e.g., as input to first responders). In an exemplary embodiment, the occupancy estimate $\hat{x}$ may be used for forensic or after the fact estimates of occupancy within a building. In yet another exemplary embodiment, the occupancy estimate $\hat{x}$ can be used to predict occupancy estimates into the near future. Near future occupancy estimates may be useful in controlling applications such as elevator calls based on the expected near future movements of occupants within a building. Near future occupancy estimates may also be useful to first responders to provide data regarding not only the present location of occupants but the likely future location of building occupants.

In an exemplary embodiment, occupancy estimation algorithm 20 is an Extended Kalman Filter (EKF), which is a well known algorithm used to generate state estimates of a system based on observations and models. A benefit of the EKF is the ability to provide calculations based on received sensor data z and occupant traffic models f in real-time. In an exemplary embodiment, the EKF employs an occupant traffic model f to generate a predicted or model-based occupancy estimate based on a current or present occupancy estimate. In an exemplary embodiment, the model-based occupancy estimate is defined by the following equation:

$$x(t+1)=f(t,x(t))+v(t)$$ Equation 1 where x(t) represents occupancy in a region (e.g. in each zone in the example shown in FIGS. 1A and 1B) at time t, f (e.g., the occupant traffic model) is some non-linear function of time t and states x(t), and v(t) is process noise, representing the uncertainty in how occupants move in a region. The structure of the non-linear function $f$ is dependent on the region. Thus, in the example related to occupancy estimates in a building, the exact form of function $f$ will vary depending on the layout of the building (among other factors). In addition, because the structure of f describes the expected traffic patterns of occupants within the region, the form of function $f$ may also vary based on the 'mode' of the region. Mode defines the operating state of the region. For instance, during a fire or similar emergency, a building will be in an egress mode (i.e., evacuation mode) in which all occupants are modeled to move towards available exits. Other modes may be dictated by the time of day (e.g., building modes for morning activity versus building mode for afternoon activity) or other factors.

For the sake of simplicity, the following example assumes an egress mode, described with examples based on the floor plan illustrated in FIGS. 1A and 1B. Therefore, the following equation describes the occupant traffic model f for a region (e.g., zone of the floor plan shown in FIGS. 1A and 1B):

$$x_1(t+1)=x_1(t)+y_{21}(t)+y_{31}(t)-y_{16}(t) \qquad \text{Equation 2}$$

wherein $x_1(t+1)$ represents the state (e.g., number of occupants) in zone 1 at time t+1, $x_1(t$ represents the previous state of occupants in zone 1 at time t, $y_{21}(t)$ represents the number of occupants moving from zone 2 to zone 1 at time t, $y_{31}(t)$ represents the number of occupants moving from zone 3 to zone 1 at time t, and $y_{61}(t)$ represents the number of occupants moving (exiting) from zone 1 via exit 6 at time t. The model would vary for non-egress modes in which occupants are not instructed to move towards exits. For example, movement of occupants would not be confined to movements from zone 2 to zone 1, but would also include movement from zone 1 to zone 2. The structure of occupant traffic model f is therefore dependent, in part, on the layout of the building and may vary from region to region. In an exemplary embodiment based on the above example, the function relating the flow of occupants from zone 1 to exit 6 is modeled as:

$$y_{16}(t)=\min[x_1(t),\alpha^*C_{16}] \qquad \text{Equation 3}$$

wherein $C_{16}$ represents the flow capacity of the link from zone 1 to exit 6, and is selected based on physical characteristics of the passage from zone 1 to exit 6, and the parameter $\alpha$ is a tuning parameter that is specific to a particular design.

In an embodiment based on this example, the function relating the flow of occupants from zone 2 to zone 1 is modeled as:

$$y_{21}(t)=\min[a_{21}x_2(t)^*\beta/C_2^*(C_1-x_1(t))/C_1,C_{21}] \qquad \text{Equation 4}$$

where $a_{21}$ is the percent of occupants in zone 2 who have the exit in zone 1 as the nearest exit, the term $\beta/C_2$ represents the delay for occupants moving across zone 2, $C_2$ is the maximum occupancy of zone 2 (i.e., $C_2$ is proportional to the area corresponding to zone 2), the term $(C_1-x_1(t))/C_1$ represents congestion in zone 1 that slows occupants from moving into the zone, $C_{21}$ is the link capacity from zone 2 to 1, and finally $\beta$ is a tuning parameter. The flow between zone 3 and zone 1 would be modeled in the same manner used to model flow between zone 2 and zone 1. In this way, the occupant traffic model f makes predictions regarding the occupancy in a particular zone based on current information regarding occupancy in each of the zones. In other embodiments, additional modeling parameters may be employed to model additional aspects of movement through the region.

The second component of the equation used to calculate a model-based occupancy estimate (i.e., equation 1) is the process noise represented by the term v(t). The process noise term v(t) accounts for the uncertainty in how occupants move between zones. A straightforward and simplistic approach for modeling the process noise v(t) is to assume that the process noise v(t) in Equation 1 is zero-mean and Gaussian with variance proportional to state x(t) and independent among zones. In an embodiment employing the Extended Kalman Filter, the covariance matrix for the process noise is set equal to a diagonal matrix with elements corresponding to the state variance of the current estimate.

Figure 3:
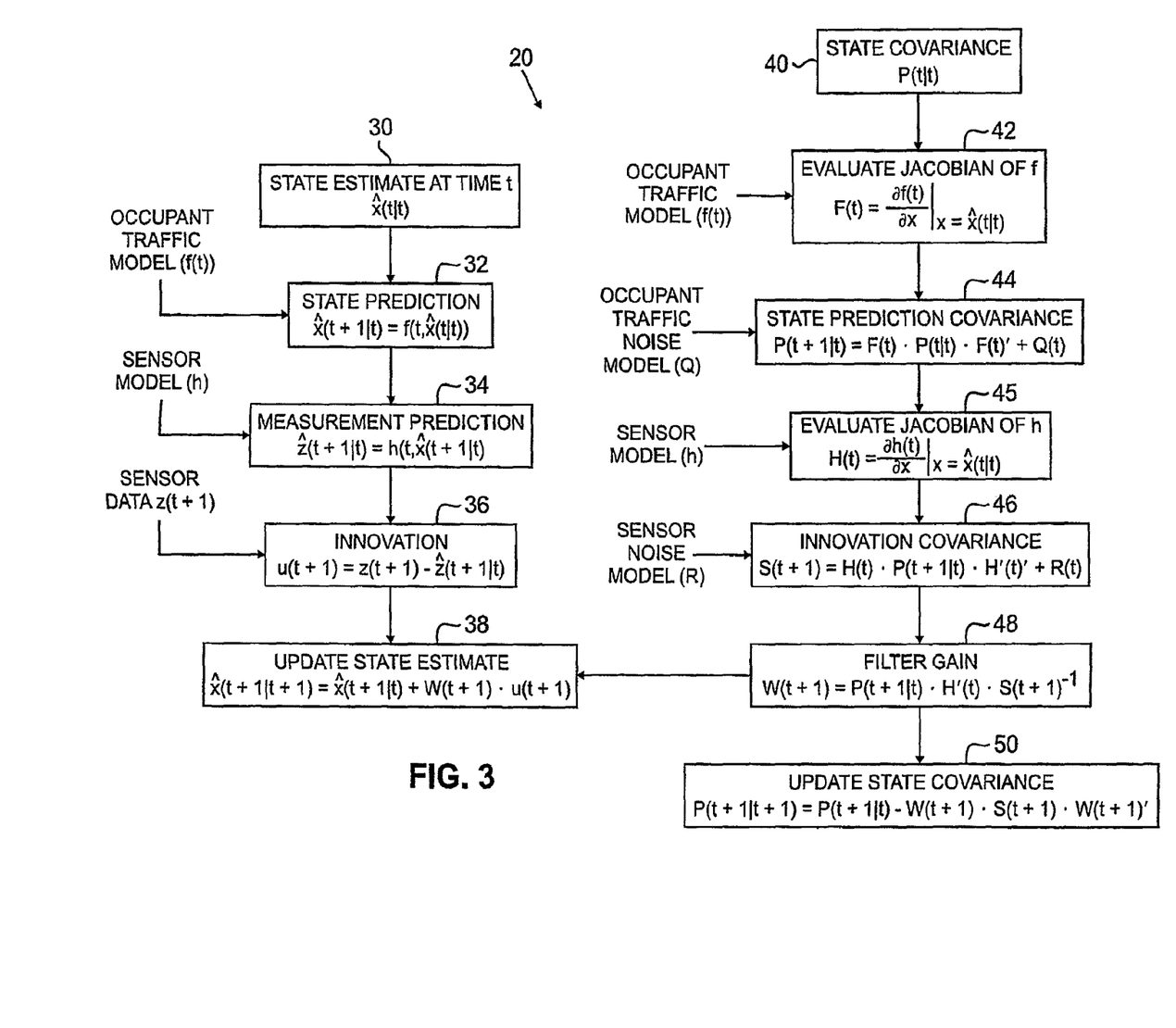
FIG. 3 is a flowchart illustrating an extended Kalman filter algorithm employed to calculate occupancy estimates.

In an exemplary embodiment the occupancy estimation algorithm (e.g., an Extended Kalman Filter) also makes use of a sensor model h, described by the following equation:

$$z(t)=h(t,x(t))+w(t) \qquad \text{Equation 5}$$

wherein output vector z(t) represents an occupancy measurement in each of the five zones at time t, function h is the sensor model and is a function of time t and occupant estimate x(t), and w(t) is sensor noise. For example, in the embodiment shown in FIGS. 1A and 1B, a sensor device is located on each border between adjacent zones, and at each exit. In an exemplary embodiment, the resulting sensor model (relevant to zone 1) for the example shown in FIGS. 1A and 1B is expressed as:

$$z_1(t)=z_1(t-1)+\phi_{21}(t)+\phi_{31}(t)-\phi_{16}(t) \qquad \text{Equation 6}$$

wherein $z_1(t-1)$ represents the previous measurement (based on sensor input) of occupants in zone 1, $\phi_{21}(t)$ represents sensor outputs indicating occupant movement from zone 2 to zone 1, $\phi_{31}(t)$ represents sensor outputs indicating occupant movement from zone 3 to zone 1, and $\phi_{16}(t)$ represents sensor outputs indicating occupant movement from zone 1 to exit 6. The sensor readings provided by individual sensor devices can be in error, and $z_1(t)$ defined in Equation 6 may therefore accumulate errors over time based on errors in individual sensor readings. However, in an embodiment in which the extended Kalman filter is employed, the sensor noise w(t) is modeled as zero mean and white, with variance equal to the variance of the estimate of the sensor-only estimator (i.e., if the occupant estimate was based only on sensor input and not on the occupant traffic model). In an exemplary embodiment, the sensor data z(t) is analyzed by applying sensor model h to outputs provided by individual sensor devices (e.g., $\phi_{21}(t)$). In another exemplary embodiment, pre-processing is performed on the sensor data z(t) such that the sensor data provided to occupancy estimation algorithm 20 reflects occupancy estimates of zones based on received sensor data (as described in more detail with respect to FIG. 3).

FIG. 3 is a flowchart illustrating an exemplary embodiment of occupancy estimation algorithm 20 as implemented with an Extended Kalman Filter that combines sensor data z(t), sensor model h, and occupant traffic model f(t) to generate occupancy estimates $\hat{x}(t|t)$. The left side of FIG. 3 illustrates the algorithm steps employed to update the state estimate of occupancy, while the right side of FIG. 3 illustrates the algorithm employed to generate a covariance estimate. The covariance estimate P(t|t) is a measure of the uncertainty associated with the occupancy estimate $\hat{x}(t|t)$. In the exemplary embodiment shown in FIG. 3, neither the sensor data z(t) nor the occupancy estimate $\hat{x}(t|t)$ are represented as vectors, although in an exemplary embodiment one or both may be vector quantities.

In this embodiment, calculating or updating of the occupancy estimate $\hat{x}(t+1|t+1)$ begins with a current occupancy estimate (generated in a previous iteration by the Extended Kalman Filter algorithm or by some initialization procedure) $\hat{x}(t|t)$, as shown at step 30. The notation of the occupancy estimate $\hat{x}(t|t)$ denotes that this is the occupancy estimate for time t, based on observations from time t (i.e., combination of both model outputs and sensor updates). At step 32, occupant traffic model f(t) is applied to the current occupancy estimate $\hat{x}(t|t)$ to generate occupancy prediction or model-based occupancy estimate $\hat{x}(t+1|t)$. That is, the occupancy in the next state is predicted based on the current state estimate and the occupant traffic model f(t). The notation $\hat{x}(t+1|t)$ denotes that this is the state prediction for time t+1 based on observations made at time t (i.e., the update is not based on the most recently observed events). At step 34, sensor model h is applied to model-based occupancy estimate $\hat{x}(t+1|t)$ to generate measurement prediction $\hat{z}(t+1|t)$. Measurement prediction $\hat{z}(t+1|t)$ represents the expected sensor measurements based on the model-based occupancy prediction $\hat{x}(t+1|t)$. For instance, if model-based occupancy prediction $\hat{x}_1(t+1|1)$ predicts that one occupant enters zone 1 from zone 2 then measurement prediction $z_{21}(t+1|t)$ will indicate a predicted sensor measurement or observation of one occupant detected entering zone 1 from zone 2.

At step 36, measurement prediction $\hat{z}(t+1|t)$ is compared with actual sensor data z(t+1) to generate a difference signal represented by the innovation variable u(t+1). In this embodiment, sensor data z(t+1) has been pre-processed to provide values representing detected occupants moving between zones. In other embodiments, sensor model h or some other function would need to be applied to incoming sensor data in order to interpret the data such that z(t+1) represents detected occupant movement between zones. Based on the comparison between sensor data z(t+1) and measurement prediction $\hat{z}(t+1|t)$, innovation u(t+1) is determined. In an exemplary embodiment, innovation u(t+1) indicates the difference between expected sensor outputs (calculated at step 34) and the actual observed sensor outputs. For instance, using the example described above, model-based occupancy estimate $x_1(t+1|t)$ predicts one occupant enters zone 1 from zone 2, resulting in a corresponding measurement prediction of $z_{21}(t+1|t)$ being equal to one. If sensor data $z_{21}(t+1)$ instead equals zero, then innovation $u_{21}(t+1)$ will indicate the difference or error between the predicted value and the actual sensor value, in this case, an error of one.

At step 38, the occupancy estimate $\hat{x}(t|t)$ is updated based on occupancy prediction $\hat{x}(t+1|t)$, innovation u(t+1) and a weighting coefficient W(t+1) discussed in more detail with respect to the covariance calculations. As indicated by this equation, the updated occupancy estimate $\hat{x}(t+1|t+1)$ is based on both the model-based occupancy estimate $\hat{x}(t+1|t)$ generated based on the occupant traffic model f(t) and the observed sensor data z(t+1). The updated state estimate $\hat{x}(t+1|t+1)$ becomes the current state estimate $\hat{x}(t|t)$ in the next iteration. A benefit of generating the state estimate as a result of both the occupant traffic model f(t) and sensor data z(t+1), is the ability to generate a state estimate indicating occupancy despite a loss of sensor data. In this scenario, the error between the predicted measurement $\hat{z}(t+1|t)$ and sensor data z(t+1) will increase, but an estimate of occupancy $\hat{x}(t+1|t+1)$ may still be generated based on partial sensor data z(t+1) and the occupant traffic model f(t), or based entirely on the occupant traffic model f(t) if no sensor data is available.

In the embodiment shown in FIG. 3, the covariance estimate P(t|t) is generated as an output along with the state estimate $\hat{x}(t|t)$. Whereas the state estimate $\hat{x}(t|t)$ indicates the best guess or estimate of occupancy, the covariance indicates the level of confidence associated with the occupancy estimate. As discussed above, the term occupancy estimate refers broadly not only to estimates regarding the actual number of occupants in a region, but also to data such as the covariance estimates P(t|t) that are calculated in conjunction with actual number of occupant estimates (e.g., $\hat{x}(t|t)$). Calculating or updating of the covariance estimate P(t+1|t+1) begins with a current estimate of the covariance P(t|t), as shown at step 40. At step 42, the occupant traffic model f(t) is evaluated based on previous occupancy estimates to generate a Jacobian matrix depicted as F(t). At step 44, the Jacobian matrix F(t), initial covariance estimate P(t|t), and uncertainty value Q(t) associated with the occupant traffic model are used to generate a predicted covariance P(t+1|t). At step 45, the sensor model h(t) is evaluated based on previous estimates to generate a Jacobian matrix depicted as H(t). At step 46, the Jacobian evaluation H(t) and uncertainty R(t) associated with the sensor model are applied to the predicted covariance P(t+1|t) to generate the innovation covariance S(t+1). At step 48, the inverse of the innovation covariance $S(t+1)^{-1}$ is used to generate weighting parameter W(t+1), which represents the weighting that is applied to the sensor data at step 38.

The weighting parameter W(t+1), as shown by the covariance calculation, weights the confidence level to be applied to the sensor data based on both the sensor models and the occupant traffic models, such that the updated state estimate $\hat{x}(t+1|t+1)$ reflects the determination of which input is most reliable. That is, if the confidence level associated with the sensor data z(t) is high (or confidence in the model-based occupancy estimate $\hat{x}(t+1|t)$ is low), then filter gain value W(t+1) as applied to the innovation u(t+1) at step 38 results in the occupancy estimate providing more weight to the sensor data z(t) than the result of the occupancy prediction $\hat{x}(t+1|1)$ generated by occupant traffic model f(t). Likewise, if the filter gain value W(t+1) indicates a low confidence associated with the sensor data z(t+1) (or confidence in the model-based occupancy estimate is high), then the updated state estimate will be more heavily influenced by the result of the model-based occupancy estimate $\hat{x}(t+1|t)$ and less by the associated sensor data z(t). For instance, in a situation in which sensors are compromised by smoke or fire, then the associated confidence of their outputs is decreased such that occupancy estimates are more heavily influenced by the result of applying occupant traffic model f(t) to the state estimate $\hat{x}(t|t)$.

The weighting of sensor data z(t) may also account for the reliability associated with the type of sensor devices used to provide sensor data z(t). Some sensors are inherently more reliable than others, while others may be reliable in some instances and unreliable in others. The sensor model h, similar to the way in which occupant traffic model f accounts for the layout of a building, can be used to account for variations in types of sensor devices.

For instance, a motion detection sensor device may be used to detect whether a room is occupied or not, but does not provide information regarding the number of occupants in a room (i.e., binary output). In this situation, data from the motion detection sensor indicating a room is not occupied (i.e., sensor data for a particular room $z_{room}(t+1)=0$) may be considered highly reliable. However, data from the motion detection sensor indicating a room is occupied (i.e., sensor data for a particular room $z_{room}(t+1)=1$) may be considered less reliable because the data does not account for the possibility that additional occupants may be present in the room. In one embodiment, the sensor model h accounts for the sensor type, and assigns an expected number of occupants located in the room based on size of the room (or some other variable).

In addition, the reliability associated with data provided by a particular sensor device may be selectively modified based on the type of sensor device as well as the input received from the sensor device.

At step 50, the state covariance P(t|t) is updated based on the filter gain value W(t+1), the innovation covariance S(t+1), and the predicted covariance P(t+1|t) to generate an updated covariance value P(t+1|t+1). This value reflects the confidence level in the occupancy estimate value $\hat{x}$(t+1|t+1).

In the embodiment shown in FIG. 3, the occupancy estimation algorithm 20 combines sensor data z(t) and model-based occupancy estimates $\hat{x}$(t+1|t) generated based on a previous occupancy estimate and a occupant traffic model f(t). In particular, this method applies Extended Kalman Filter techniques to both the sensor data z(t) and the occupant traffic model f(t) to generate an occupancy estimation $\hat{x}$(t+1|t+1) that takes into account the reliability of these inputs. The result is occupancy estimates $\hat{x}$(t+1|t+1) that are highly reliable and covariance estimates P(t+1|t+1) that provide an indication of associated reliability of provided occupancy estimates.

Figure 4:
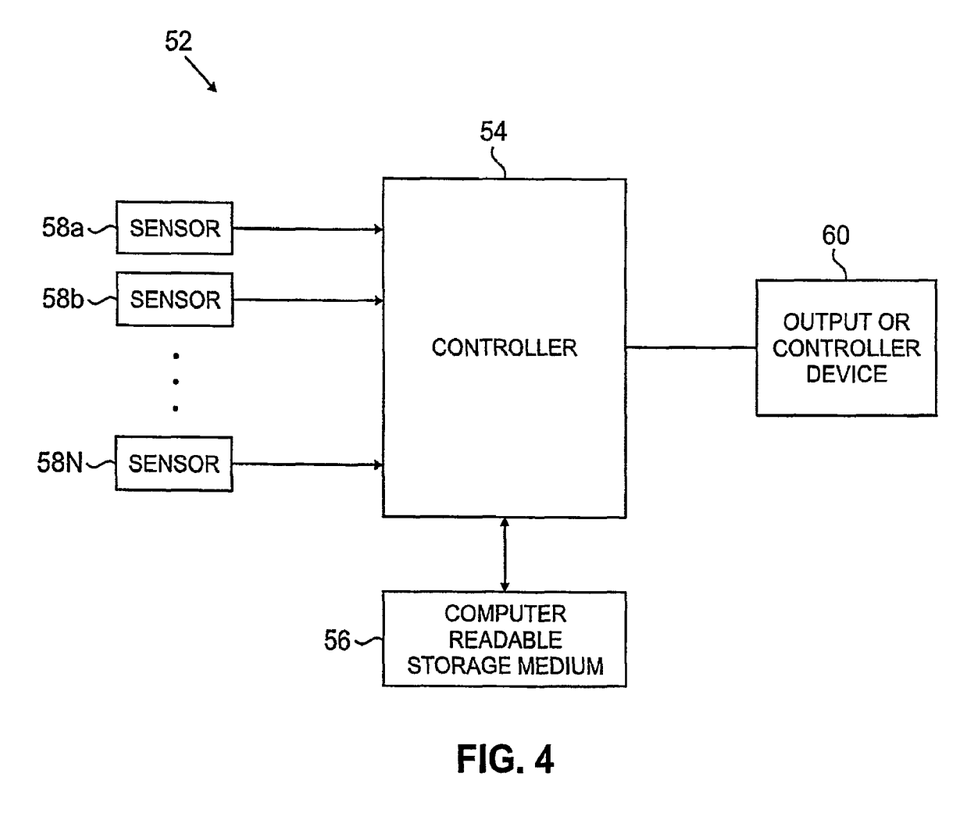
FIG. 4 is a block diagram of a centralized occupancy detection system.

FIG. 4 illustrates an exemplary embodiment of a centralized system 52 for providing occupancy estimations for a region (e.g., each zone of the building as shown in FIGS. 1A and 1B). Centralized system 52 includes computer or controller 54, computer readable medium 56, a plurality of sensor devices 58a, 58b, . . . 58N, and display or controller device 60. Sensor devices 58a-58N are distributed throughout a particular region, and may include a variety of different types of sensors, including video detectors, passive infra-red motion sensors, access control devices, elevator load measurements, IT-related techniques such as detection of computer keystrokes, as well as other related sensor devices. In addition, many occupants carry active devices, such as active or passive radio frequency identification (RFID) cards, cell phones, or other devices that can be detected to provide sensor data.

The sensor data is communicated to computer or controller 54. Depending on the type of sensors employed, and whether the sensors include any ability to process captured data, computer 54 may provide initial processing of the provided sensor data. For instance, video data captured by a video camera sensing device may require some video data analysis pre-processing to determine whether the video data shows occupants traversing from one zone to another zone. In addition, this processing performed by processor 54 may include storing the sensor data, indicating detected occupants moving between zones, to an array or vector such that it can be supplied as an input to the occupancy estimation algorithm (e.g., an Extended Kalman Filter).

In the embodiment shown in FIG. 4, computer 54 executes the steps of processes to generate the occupancy estimate. For instance, in an exemplary embodiment this may include performing the functions and operations described with respect to FIG. 4. Thus, the disclosed invention can be embodied in the form of computer or controller implemented processes and apparatuses for practicing those processes. The present invention can also be embodied in the form of computer program code containing instructions embodied in computer readable medium 56, such as floppy diskettes, CD-ROMs, hard drives, or any other computer-readable storage medium, wherein, when the computer program code is loaded into and executed by computer 54, the computer becomes an apparatus for practicing the invention. The present invention may also be embodied in the form of computer program code as a data signal, for example, whether stored in a storage medium 56, loaded into and/or executed by a computer or controller 54, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

For example, in an embodiment shown in FIG. 4, computer readable storage medium 56 may store program code or instructions describing the occupant traffic model f, sensor model h, and an occupancy estimation algorithm (e.g., Extended Kalman Filter). The computer program code is communicated to computer or controller 54, which executes the program code to implement the processes and functions described with respect to the present invention (e.g., executing those functions described with respect to FIG. 3).

As shown in FIG. 4, computer or controller 54 generates an occupancy estimate that is provided to display or controller device 60. The occupancy estimate may include data including mean estimates of the number of occupants located in a region, probabilities associated with each possible occupancy level, changes in occupancy, data indicative of the reliability or confidence associated with an estimate of occupancy, as well as other useful data related to occupancy. The occupancy estimates may be simply displayed to a user or users (e.g., first-responders) via a display device, or may be provided to a controller device that takes some action based on the received occupancy estimate. For instance, the controller device may be a heating, venting and air-conditioning (HVAC) system, elevator control system, emergency egress controllers, as well as others. The data may be provided via any number of communication networks, including telecommunication networks, wireless networks, as well as other well known communication systems.

Figure 5A:
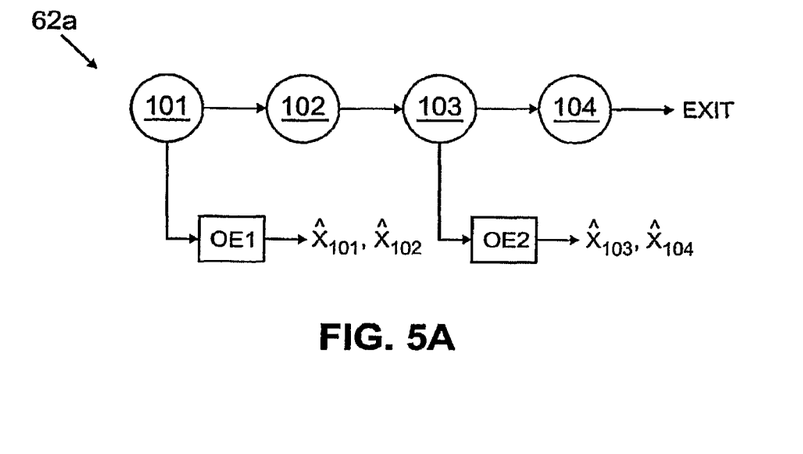
FIGS. 5A-5C are block diagrams illustrating a number of distributed occupancy estimation systems.
Figure 5B:
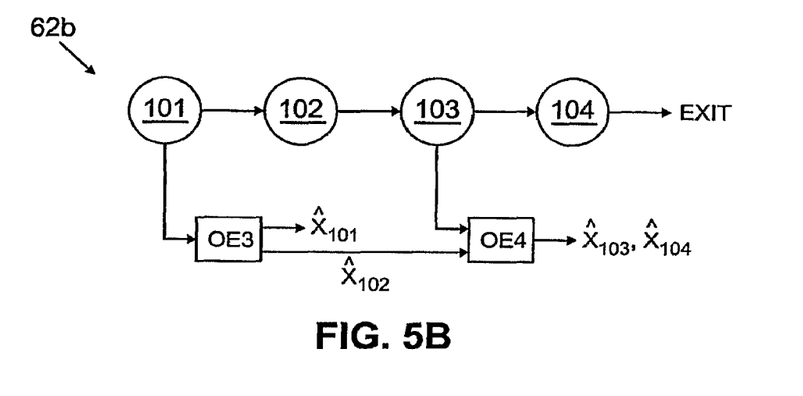
Figure 5C:
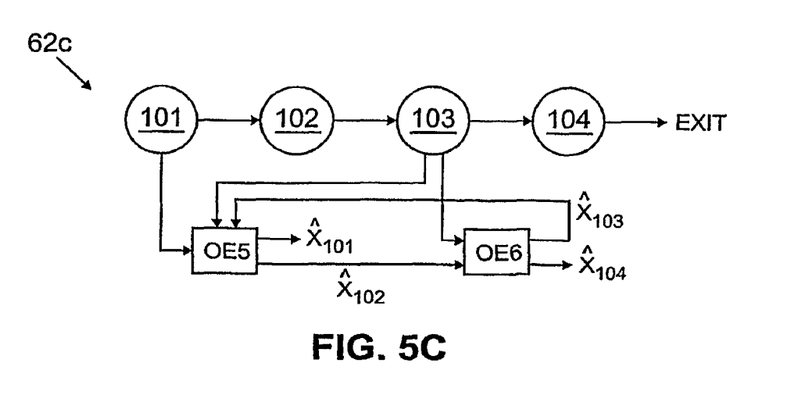

FIGS. 5A-5C illustrate a number of distributed systems 62a, 62b, and 62c for estimating occupancy. This is in contrast with centralized system 52 shown in FIG. 4, in which all sensor data was provided to a single computer or controller 54, which then generated occupancy estimates for an entire region. For the sake of simplicity, the examples shown in FIGS. 5A-5C include only four sub-regions (labeled nodes 101, 102, 103, and 104), although the concepts illustrated in these examples could be expanded to an area or building having any number of sub-regions.

In the embodiment shown in FIG. 5A, distributed system 62a includes sensor devices located in nodes 101 and 103, wherein each sensor device (or associated hardware) includes the capability of processing the data provided by the associated sensor device and applying the occupancy estimator algorithm based on the sensed data and associated occupant traffic models and sensor models. In an exemplary embodiment, the occupancy estimation algorithm is implemented with an Extended Kalman Filter which generates based on these inputs an occupancy estimation and a covariance (as well as any other useful statistical outputs). For purposes of this description, the distributed occupancy estimation system 62a that includes both the sensor device and the components used to generate the occupancy estimate, which may include a combination of hardware and software for applying the occupancy estimation algorithm to the sensor data, will be referred to generally as occupancy estimator (OE). In the embodiment shown in FIG. 5A, sensor data observed at node 101 is provided to occupancy estimator OE1, which generates occupancy estimates $\hat{x}_{101}$(t) and $\hat{x}_{102}$(t) corresponding to nodes 101 and 102, respectively. Sensor data observed at node 103 is provided to occupancy estimator OE2, which generates occupancy estimates $\hat{x}_{103}$(t) and $\hat{x}_{104}$(t) corresponding to nodes 103 and 104, respectively. In the embodiment shown in FIG. 5A, the occupancy estimator OE1 and occupancy estimator OE2 do not share information regarding the occupancy estimates of the respective nodes.

In distributed system 62b shown in FIG. 5B, sensor devices are once again located at nodes 101 and 103. In this embodiment however, occupancy estimate $\hat{x}_{102}(t)$ generated by occupancy estimator OE3 is provided as an input to occupant estimator OE4. A benefit of distributed system 60b is the ability of occupancy estimator OE4 to base occupancy estimates $\hat{x}_{103}(t)$ and $\hat{x}_{104}(t)$ in part on knowledge regarding the occupancy of node 102. For instance, if the occupancy estimate $\hat{x}_{102}(t)$ indicates one or more occupants located in node 102, then occupancy estimator OE4 may predict that in the next time step the occupant located in node 102 will move from node 102 to node 103 (based once again on an egress mode of operations in which occupants move toward an exit connected to node 104), thereby improving the predicted occupancy estimations by incorporating the additional data.

In distributed system 62c shown in FIG. 5C, sensor devices are once again located at nodes 101 and 103. In this embodiment however, occupancy estimate $\hat{x}_{102}(t)$ made by occupancy estimator OE5 is provided as an input to occupancy estimator OE6, and both sensor data from node 103 and occupancy estimate $x_{103}(t)$ are provided as input to occupancy estimator OE5. This embodiment illustrates a distributed application in which both occupancy estimates and sensor data is shared by associated occupancy estimators. A benefit of this system is the ability of occupancy estimators OE5 and OE6 to base occupancy estimates on the additional data made available, thus improving the overall reliability and performance of distributed system 60c.

Communication of occupancy estimations between occupancy estimators may be provided via typical communication networks, including telecommunication networks, local area network (LAN) connections, or via wireless networks. In addition, in some embodiments communication costs are minimized by only sharing occupancy estimates between adjacent nodes/zones, such that only those occupancy estimators monitoring adjacent zones share occupancy estimates. A benefit of employing distributed systems for providing occupancy estimates is the ability of distributed systems to function despite the loss of one or more of the distributed systems.

Although the present invention has been described with reference to preferred embodiments, workers skilled in the art will recognize that changes may be made in form and detail without departing from the spirit and scope of the invention. For example, although a computer system including a processor and memory was described for implementing the occupancy estimation algorithm, any number of suitable combinations of hardware and software may be employed for executing the mathematical functions employed by the occupancy estimation algorithm. In addition, the computer system may or may not be used to provide data processing of received sensor data. In some embodiments, the sensor data may be pre-processed before being provided as an input to the computer system responsible for executing the occupancy estimation algorithm. In other embodiments, the computer system may include suitable data processing techniques to internally process the provided sensor data.

Furthermore, throughout the specification and claims, the use of the term 'a' should not be interpreted to mean "only one", but rather should be interpreted broadly as meaning "one or more". The use of sequentially numbered steps used throughout the disclosure does not imply an order in which the steps must be performed. The use of the term "or" should be interpreted as being inclusive unless otherwise stated.

The invention claimed is:

1. A system for estimating in a region, the system comprising:
    an input operably connected to receive sensor data from one or more sensor devices for a current period;
    an occupancy estimator operably connected to the input, wherein the occupancy estimator is configured to generate an occupancy, estimate based on an additive combinations of an estimate for the region based on the received sensor data, and
    a predictive model-based occupancy estimate generated by an occupant traffic model for a previous period; and
    an output operably connected to the occupancy estimator to communicate the occupancy estimate generated by the occupancy estimator;
    wherein the occupancy estimator calculates a weighting parameter based, at least in part, on the received sensor data and the occupant traffic model and generates. the occupancy estimate based on the calculated weighting parameter.

2. The system of claim 1, wherein the occupant traffic model generates the occupancy estimate based, at least in part, on a previous occupancy estimate.

3. The system of claim 1, wherein the occupancy estimator generates the occupancy estimates in real-time.

4. The system of claim 1, wherein the occupancy estimate comprises a mean estimate of the number of occupants within the region, an estimate of occupant movement within the region, a probability associated with all possible numbers of occupants associated with the region, a confidence level estimate, a predictive occupancy estimate generated with respect to future points in time, or a combination thereof.

5. The system of claim 1, wherein the occupant traffic model comprises a mathematical model, a computer simulation, a statistical model, or a combination thereof.

6. The system of claim 1, wherein the system comprises a centralized system in which the occupancy estimator is operably connected to receive data from a plurality of sensors located throughout the region and in response generates the occupancy estimate.

7. The system of claim 1, wherein the system comprises a distributed system including a plurality of occupancy estimators, wherein each of the plurality of occupancy estimators receives sensor data associated with a proximate location of the region and executes an algorithm to generate an occupancy estimate for the proximate location based on the received sensor data and an occupant traffic model associated with the proximate location.

8. The system of claim 7, wherein one of the plurality of occupancy estimators is connected to an adjacent occupancy estimators to receive occupancy estimates generated by the adjacent occupancy estimation device with respect to a distal location, wherein the occupancy estimator incorporates the occupancy estimate with respect to the distal location in generating the occupancy estimate for the proximate location.

9. The system of claim 7, wherein one of the plurality of occupancy estimators is connectable to receive sensor data from both a proximate location and a distal location, wherein the occupancy estimators incorporates the sensor data received with respect to the distal location in generating the occupancy estimate for the proximate location.

10. A system for estimating in a region, the system comprising:
    an input connected to receive sensor data from one or more sensor devices for a current period;

an occupancy estimator operably connected to the input wherein the occupancy estimator is configured to generate an occupancy estimate based on an additive combinations of an estimate for the region based on the received sensor data, and a predictive model-based occupancy estimate generated by an occupant traffic model for a previous period; and an output operably connected to the occupancy estimator to communicate the occupancy estimate generated by the occupancy estimator; wherein the occupancy estimate comprises a mean estimate of the number of occupants within the region, an estimate of occupant movement within the region a probability associated with all possible numbers of occupants associated with the region, a confidence level estimate, a predictive occupancy estimate generated with respect to future points in time, or a combination thereof wherein the reliability estimate includes a covariance value or a standard deviation value calculated with respect to the region.

11. A system for estimating occupancy in a region the system comprising:

an input operably connected to receive sensor data from one or more sensor devices for a current period;

an occupancy estimator operably connected to the input, wherein the occupancy estimator is configured to generate an occupancy estimate based on an additive combinations of an estimate for the region based on the received sensor data, and a predictive model-based occupancy estimate generated by an occupant traffic model for a previous period; and an output operably connected to the occupancy estimator to communicate the occupancy, estimate generated by the occupancy estimator; wherein the algorithm employed by the occupancy estimator is comprises an Extended Kalman Filter that generates the occupancy estimate that includes a mean estimate of occupancy for the region and a covariance associated with each mean estimate of occupancy.

12. A method for estimating occupancy in a region, the method comprising:

acquiring sensor data from one or more sensor devices;

calculating a model-based occupancy estimate based on an occupant traffic model that predicts movements of occupants within a region in a future period; and generating an occupancy estimate for the region based on an additive combination of the acquired sensor data and the model-based occupancy estimate; wherein calculating the model-based occupancy estimate includes applying the occupant traffic model to a previous occupancy estimate.

13. The method of claim 12, further including:

calculating a weighting parameter associated with the acquired sensor data and the model-based occupancy estimate; and generating the occupancy estimate based, in addition, on the calculated weighting parameter.

14. The method of claim 12, wherein the occupancy estimate comprises a mean estimate of the number of occupants within the region, an estimate of occupant movement within the region, a probability associated with all possible numbers of occupants associated with the region, a confidence level estimate, a covariance value, a standard deviation, a predictive occupancy estimate generated with respect to future points in time, or a combination thereof.

15. The method of claim 12, wherein the occupant traffic model comprises a mathematical function, a statistical model, a computer simulation, or a combination.

16. The method of claim 12, wherein generating an occupancy estimate includes:

calculating a measurement prediction based on the model-based occupancy estimate and a sensor model;

calculating an innovation based on a comparison of the measurement prediction to the acquired sensor data; and applying a weighting parameter to the innovation estimate and combining with the predicted occupancy estimate to generate the occupancy estimate.

17. A distributed system for estimating occupancy within a building, the system comprising:

a first occupancy estimator connectable to receive sensor data associated with a first location and for executing an algorithm to generate a first occupancy estimate for the first location based on an additive combination of the received sensor data associated with the first location and a predictive model-based occupancy estimate generated for the first location b a first occupant traffic model;

a second occupancy estimator connectable to receive sensor data associated with a second location and for executing an algorithm to generate a second occupancy estimate for the second location based on an additive combination of the received sensor data associated with the second location and a predictive model-based occupancy estimate generated for the second located by a second occupant traffic mode; and a communication network connecting the first occupancy estimator to the second occupancy estimator, wherein the first occupancy estimator communicates the first occupancy estimate to the second occupancy estimator.

18. The distributed system of claim 17, wherein the second occupancy estimator communicates the second occupancy estimate to the first occupancy estimator.

19. The distributed system of claim 17, wherein the first occupancy estimator is connectable to receive sensor data associated with the second location.

* * * * *